United States Patent
Derehag et al.

(10) Patent No.: US 12,452,139 B2
(45) Date of Patent: *Oct. 21, 2025

(54) NETWORK DATA ANALYTICS FUNCTION ARCHITECTURE WITH DYNAMIC ANALYTIC FUNCTIONS

(71) Applicant: Telefonaktiebolaget LM Ericsson (publ), Stockholm (SE)

(72) Inventors: Jesper Derehag, Kareby (SE); Mats Stille, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 40 days.

This patent is subject to a terminal disclaimer.

(21) Appl. No.: 18/278,320

(22) PCT Filed: Nov. 29, 2021

(86) PCT No.: PCT/EP2021/083394
§ 371 (c)(1),
(2) Date: Aug. 22, 2023

(87) PCT Pub. No.: WO2022/179726
PCT Pub. Date: Sep. 1, 2022

(65) Prior Publication Data
US 2024/0129200 A1    Apr. 18, 2024

Related U.S. Application Data

(60) Provisional application No. 63/276,722, filed on Nov. 8, 2021, provisional application No. 63/152,388, filed on Feb. 23, 2021.

(51) Int. Cl.
*G06F 15/16* (2006.01)
*H04L 41/14* (2022.01)
*H04L 41/40* (2022.01)

(52) U.S. Cl.
CPC .............. *H04L 41/14* (2013.01); *H04L 41/40* (2022.05)

(58) Field of Classification Search
CPC ................................ H04L 41/14; H04L 41/40
See application file for complete search history.

(56) References Cited

U.S. PATENT DOCUMENTS

2019/0356558 A1* 11/2019 Han ........................ H04L 41/14

FOREIGN PATENT DOCUMENTS

WO    2019/197467 A1    10/2019

OTHER PUBLICATIONS

International Search Report and Written Opinion issued in International Application No. PCT/EP2021/083394 dated Mar. 7, 2022 (11 pages).

(Continued)

*Primary Examiner* — Padma Mundur
(74) *Attorney, Agent, or Firm* — Rothwell, Figg, Ernst & Manbeck, P.C.

(57) ABSTRACT

A system for network data analytics, the system comprising a network data analytics function, NWDAF, (200) and at least one NWDAF service consumer function, SCF, (220) arranged to connect to the NWDAF (200), wherein the SCF (220) is arranged to obtain (Sa1) a dynamic analytics function definition, wherein the dynamic analytics function definition defines a custom analytics function for processing data at the NWDAF (200), and register (Sa4, 310, 410) the dynamic analytics function definition at the NWDAF (200), wherein the NWDAF (200) is arranged to receive (Sb1) the dynamic analytics function definition from the SCF (220), assign (Sb3) an analytics function identifier to the received dynamic analytics function definition, transmit (Sb4, 320, 420) the analytics function identifier back to the SCF (220), and register (Sb5) the dynamic analytics function definition (Continued)

in an analytics function definition store of the NWDAF (200), wherein the SCF (220) is arranged to receive (Sa5, 320) the analytics identifier associated with the registered dynamic analytics function definition from the NWDAF (200) in response to the registering.

20 Claims, 4 Drawing Sheets

(56) References Cited

OTHER PUBLICATIONS

3GPP TR 23.700-91 V17.0.0 (Dec. 2020), 3rd Generation Partnership Project; Technical Specification Group Services and System Aspects; Study on enablers for network automation for the 5G System (5GS): Phase 2 (Release 17), Dec. 2020 (382 pages).
3GPP TR 23.791 V16.2.0 (Jun. 2019), 3rd Generation Partnership Project; Technical Specification Group Services and System Aspects; Study of Enablers for Network Automation for 5G (Release 16), Jun. 2019 (124 pages).
Wu, Z. et al., "Swift: A Fast Dynamic Packet Filter," 5th USENIX Symposium on Networked Systems Design and Implementation (nsdi '08), Apr. 2008 (18 pages).
McCanne, S. et al., "The BSD Packet Filter: A New Architecture for User-level Packet Capture," 1993 Winter USENIX—Jan. 25-29, 1993 (12 pages).
3GPP TS 23.288 V17.0.0 (Mar. 2021), 3rd Generation Partnership Project; Technical Specification Group Services and System Aspects; Architecture enhancements for 5G System (5GS) to support network data analytics services (Release 17), Mar. 2021 (159 pages).

* cited by examiner

NETWORK DATA ANALYTICS FUNCTION ARCHITECTURE WITH DYNAMIC ANALYTIC FUNCTIONS

CROSS REFERENCE TO RELATED APPLICATIONS

This application is a 35 U.S.C. § 371 National Stage of International Patent Application No. PCT/EP2021/083394, filed 2021 Nov. 29, which claims priority to U.S. provisional patent application No. 63/152,388, filed on 2021 Feb. 23 and which also claims priority to U.S. provisional patent application No. 63/276,722, filed on 2021 Nov. 8. The above identified provisional applications are incorporated by this reference.

TECHNICAL FIELD

The present disclosure relates to network data analytics functions (NWDAF) which facilitate gathering and analysis of data from wireless and wireline communication networks for use by various NWDAF service consumers. The disclosed methods are particularly suitable for use in third generation partnership program (3GPP) defined networks, but may also find uses in other types of networks. There are disclosed methods, network nodes, and network management tools for data collection, as well as computer programs and computer program products configured for facilitating network data analytics.

BACKGROUND

As part of the standardization of the fifth generation core (5GC) by the third generation partnership program (3GPP), the network data analytics function (NWDAF) was proposed as an interoperable network analytics function. In essence, the NWDAF allows an NWDAF service consumer to subscribe to well-defined events from network functions (NF) (or other analytic functions) and provide data analytics support to a subscriber regarding these events. For example, an analytics function may comprise providing user equipment (UE) mobility prediction to an NWDAF analytics consumer.

The NWDAF function is described in detail in 3GPP technical specification (TS) 23.288 V17.0.0.

In the current NWDAF technical specification (V17.0.0), any analytics functions to be executed by the NWDAF in order to process or refine the gathered data must either be comprised in a set of standardized analytics functions of the NWDAF or part of a non-standard proprietary implementation of the NWDAF. The responsibility of defining and implementing new analytic functions is therefore in the domain of the standardization bodies and/or the NWDAF implementor, and removed from the operators that actually use the NWDAF services. This situation is likely to lead to reduced flexibility and inefficiencies in the overall NWDAF framework.

A further problem associated with proprietary implementations of analytic functions in the NWDAF architecture is that the NWDAF service consumer may not be able to discover which analytics functions that are actually implemented in a given NWDAF system in a convenient manner.

There is a need for an improved NWDAF architecture which is more flexible, and which is able to support more types of analytics function definitions as well as more types of event definitions for data collection from various data sources in the network. There is a desire to provide a more general and flexible NWDAF framework.

SUMMARY

It is an object of the present disclosure to provide an improved NWDAF architecture. This object is obtained at least in part by a system for network data analytics. The system comprises an NWDAF and at least one NWDAF service consumer function (SCF) arranged to connect to the NWDAF. The SCF is arranged to obtain a dynamic analytics function definition, wherein the dynamic analytics function definition defines a custom analytics function for processing data at the NWDAF, and register the dynamic analytics function definition at the NWDAF. The NWDAF is arranged to receive the dynamic analytics function definition from the SCF, assign an analytics function identifier to the received dynamic analytics function definition, transmit the analytics function identifier back to the SCF, and also register the dynamic analytics function definition in an analytics function definition store of the NWDAF. The SCF can then receive the analytics identifier associated with the registered dynamic analytics function definition from the NWDAF in response to the registering.

This way a much more flexibly and future-proof NWDAF architecture is provided, where operators and other NWDAF service consumers can register their own defined analytic functions at the NWDAF, in case no suitable function is found amount the standardized set of functions. Once registered, the analytic function can be used by the service consumer just like any other analytic function, e.g., one part of the standard.

Optionally, the NWDAF and/or the SCF is also arranged to verify the dynamic analytics function definition in accordance with one or more pre-determined verification criteria and abort the registration process if the verification criteria are not fulfilled. This way the integrity of the registered analytics functions can be maintained, despite the definitions being provided by the consumer. The verification can be performed at the SCF, at the NWDAF, or at both places in the architecture.

At the SCF side, a computer implemented method is performed in a network node implementing an NWDAF SCF. This method comprises obtaining a dynamic analytics function definition, wherein the dynamic analytics function definition defines a custom analytics function for processing data at the NWDAF, registering the dynamic analytics function definition at the NWDAF, and receiving the analytics identifier associated with the registered dynamic analytics function definition from the NWDAF in response to the registering.

According to aspects, the method comprises associating the dynamic analytics function definition with a model training logical function, MTLF. It is an advantage that the methods proposed herein are compatible with and even improve on the functions related to the MTLF structure which has recently been discussed at the 3GPP.

According to aspects, the method comprises verifying the dynamic analytics function definition in accordance with one or more pre-determined verification criteria and aborting the registration process if the verification criteria are not fulfilled. It is an advantage that some verification is performed already at the SCF side, such that less flawed definitions are submitted to the NWDAF. Also, the NWDAF may not be able to detect all flaws in a definition, e.g., in case the flaw depends on data only available at the SCF side.

According to aspects, the method comprises transmitting the dynamic analytics function definition to the NWDAF as a program code. This allows a service consumer to define more or less arbitrary analytics functions on demand, which is an advantage.

At the NWDAF side, a computer implemented method is performed in a network node implementing an NWDAF which is arranged to communicate with at least one NWDAF SCF. The method comprises receiving a dynamic analytics function definition from the SCF, assigning an analytics function identifier to the received dynamic analytics function definition, transmitting the analytics function identifier back to the SCF, and registering the dynamic analytics function definition in an analytics function definition store of the NWDAF. This method is associated with the above-mentioned advantages. By allowing more or less arbitrary function definitions to be registered, a much more versatile service offering is provided towards the service consumers. The SCFs no longer have to limit themselves to standardized analytics functions and analytics functions which are part of a proprietary implementation in the NWDAF, which is an advantage.

According to aspects, the method comprises verifying the dynamic analytics function definition in accordance with one or more pre-determined verification criteria and aborting the registration process if the verification criteria are not fulfilled. This improves the integrity of the function definition and may prevent harmful code from being registered in the NWDAF system. An error message is optionally transmitted back to the SCF in case one or more of the verification criteria were not fulfilled, informing the SCF about the error. The verification criteria optionally comprise a security criterion indicative of a data access associated with the dynamic analytics function definition, to ensure, e.g., that data integrity is maintained.

According to aspects, the method comprises publishing a pre-determined static analytics function identifier towards a network repository function (NRF) associated with the NWDAF. This lets the other nodes in the system know that the NWDAF supports the concept of dynamic analytic function definitions discussed herein. For instance, by publishing a supported AnalyticsID=0, the other nodes in the network becomes aware of the capability of the NWDAF to support the registration of dynamic analytics functions. The methods optionally also comprise transmitting a list of supported dynamic analytic functions in response to a request from the SCF associated with the pre-determined static analytics function identifier. This allows a service consumer to receive a list of which dynamic analytic functions that are already available at a given NWDAF. If a suitable function is available, then this function can be re-used. If no suitable function is available, then a new functions can be registered at the NWDAF, which can then potentially be re-used by some other service consumer in the future.

According to aspects, the method comprises associating an NWDAF sidecar container with the assigned analytics function identifier. This simplifies processing at the NWDAF.

According to aspects, the method comprises associating the assigned analytics function identifier with an MTLF. The present proposal can be used in combination with the aspects related to MTLF which is being introduced into the 3GPP standards. This is an advantage, since the two complement each other.

The above-mentioned advantages are also obtained by computer programs, computer program products, and network nodes, as will be discussed in more detail below.

BRIEF DESCRIPTION OF THE DRAWINGS

The present disclosure will now be described in more detail with reference to the appended drawings, where.

DETAILED DESCRIPTION

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1:
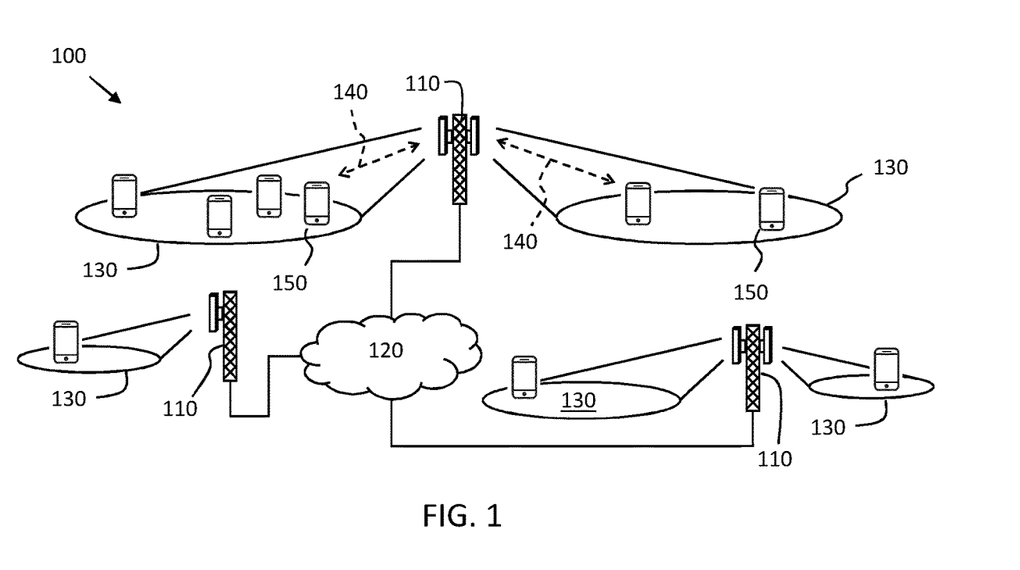
FIG. 1 shows an example wireless communication network built around a core network.

FIG. 1 schematically illustrates an example communication system 100 comprising radio access network nodes 110 which provide wireless access 140 over a plurality of coverage areas 130. The radio access network nodes are connected to a core network 120. Wireless devices 150 of different types connect to the core network 120 via the radio access network nodes 110.

The communication system may be part of a fifth generation (5G) communication system (5GS) as defined by the 3GPP. However, the techniques disclosed herein are generally applicable, and can be implemented in other communication systems also, such as a 3GPP 4G system. The techniques are most likely also applicable in future communication systems yet to be deployed, such as a 3GPP sixth generation (6G) communication system.

Figure 2:
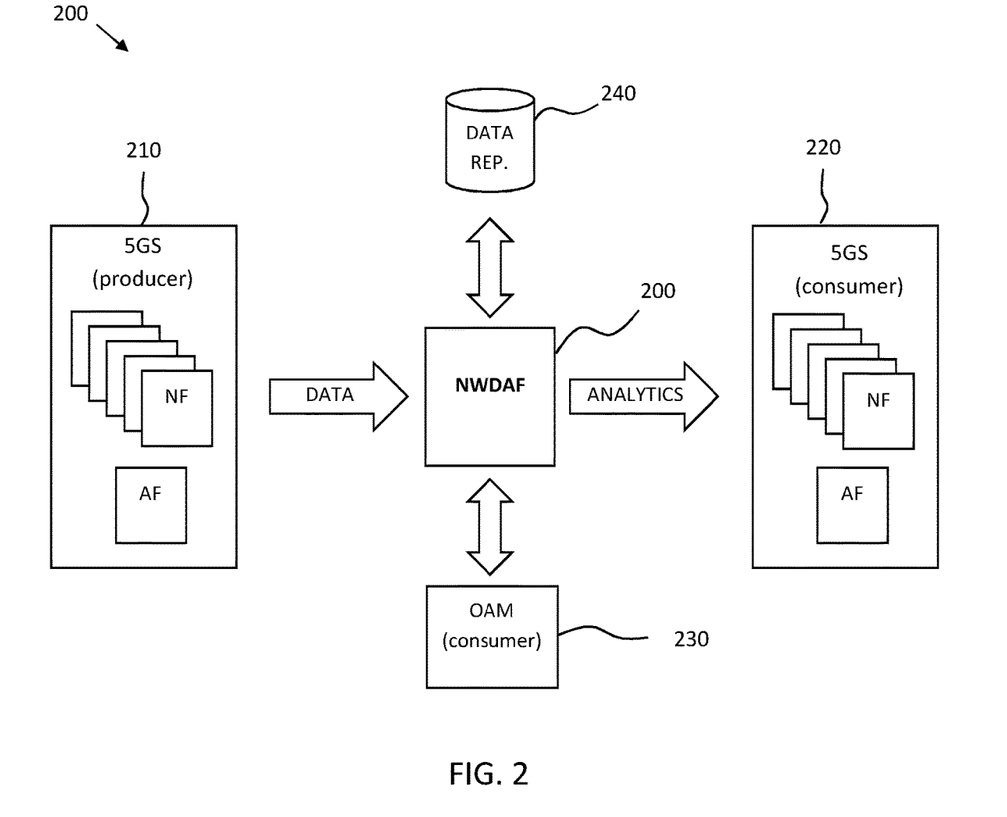
FIG. 2 schematically illustrates an NWDAF system from a functional perspective.

An operator wishing to obtain data for analysis of the operations, events, and status, in the system 100 may use the network analytics function (NWDAF) described in, e.g., 3GPP TS 23.288 V17.0.0, and schematically illustrated in FIG. 2. A target 5G system (5GS) 210 (where the data of interest for the analysis is generated) comprises a number of network functions (NF) and one or more application functions (AF). Some example NFs comprise User Plane Functions (UPF), Access and Mobility Management Functions (AMF), and Session Management Functions (SMF).

Various events and datapoints related to the operational data of the producer 5GS 210 can be subscribed to by the NWDAF 200 as detailed in 3GPP TS 23.288 V17.0.0. This data is then made available to an NWDAF SCF which can be some other 5GS 220, an operations and maintenance (OAM) function 230, and/or a data repository 240. Thus, the term service consumer is to be interpreted broadly herein as any entity of function using the services provided in the NWDAF architecture. Any network node or function wishing to obtain analytical data from the NWDAF is associated with a NWDAF service consumer function. An NWDAF service consumer function may be implemented on one network node or distributed over several network nodes.

Generally, the architecture 200 allows an NWDAF SCF to subscribe to network analytics from the NWDAF, by sending an analytics subscription request for a given analytics function to the NWDAF, which will then feed back data to the SCF according to the definition of the analytics function.

An important observation is that with the current standard, all analytics functions must either be standardized beforehand or considered for proprietary implementation in the NWDAF. Thus, from a requirements perspective, an operator will need to either push for new analytic definitions into the standard, or the NWDAF manufacturers need to implement it as a non-standard implementation. To add a new novel Analytic-ID, practically speaking most NWDAF implementations will likely force an upgrade of the software, making small adjustments to analytic functions very expensive. In any case, the responsibility of defining and implementing new analytic functions are pushed from the operator or the implementor of NFs to the NWDAF implementor. This is an undesirable situation, since it is close to impossible to predict all possible analytic functions that any operator may (or may not need) several years into the future, making the current analytics function set-up somewhat sub-optimal.

The present disclosure proposes to let an operator, or other NWDAF service consumer, define customized analytics functions, e.g., by custom computer program code, script, or other means of unambiguous analytic function definition, and then send these analytic function specifications to the NWDAF. The NWDAF is then instructed by the analytic function definition to process gathered data in order to generate analytical reports which can then be retrieved to by the consumer. This way the responsibility for defining analytics functions is at least partly transferred to the operators, so that operators can define their own analytic functions on demand by extending the current AnalyticsInfo procedures of 3GPP TS23.288 V17.0.0. An NWDAF service consumer can register custom programs in the NWDAF associated with a set of Event-IDs rather than having to rely on specific Analytics-IDs being defined in the NWDAF beforehand. The techniques proposed herein allow operators and/or NF implementers to dynamically define analytic functions according to their own needs. The techniques proposed herein also allows for updating of analytic functions without having to deploy new software version of the NWDAF, which is an advantage.

It is noted that 3GPP TR 23.700-91 V17.0.0 2020-12-17, and section 6.5 in particular, discusses machine learning (ML) model provisioning functions (MTLF). These techniques are somewhat related to what is proposed herein, but differ in some main respects. Both the MTLF and the studies in TR 23.700-91 all assume that an ML model is associated with an already existing Analytics-ID, which must then be a standardized or proprietary analytics function as discussed above. The proposals in 3GPP TR 23.700-91 do not allow for arbitrary and dynamic analytics-IDs to be defined by an NWDAF service consumer on-demand. How to define the specification of a dynamic analytic functions is a complicated venture as there are many ways of expressing these specifications. In other words, while TR 23.700-91 V17.0.0 outline different ways of managing machine learning models part of the NWDAF architecture, it does not discuss dynamically creating new analytic functions and making then available to a service consumer in a convenient manner. By means of the methods disclosed herein, machine learning models and methods associated with yet to be defined analytics functions are enabled, as will be discussed below in connection to FIG. 5.

Figure 3:
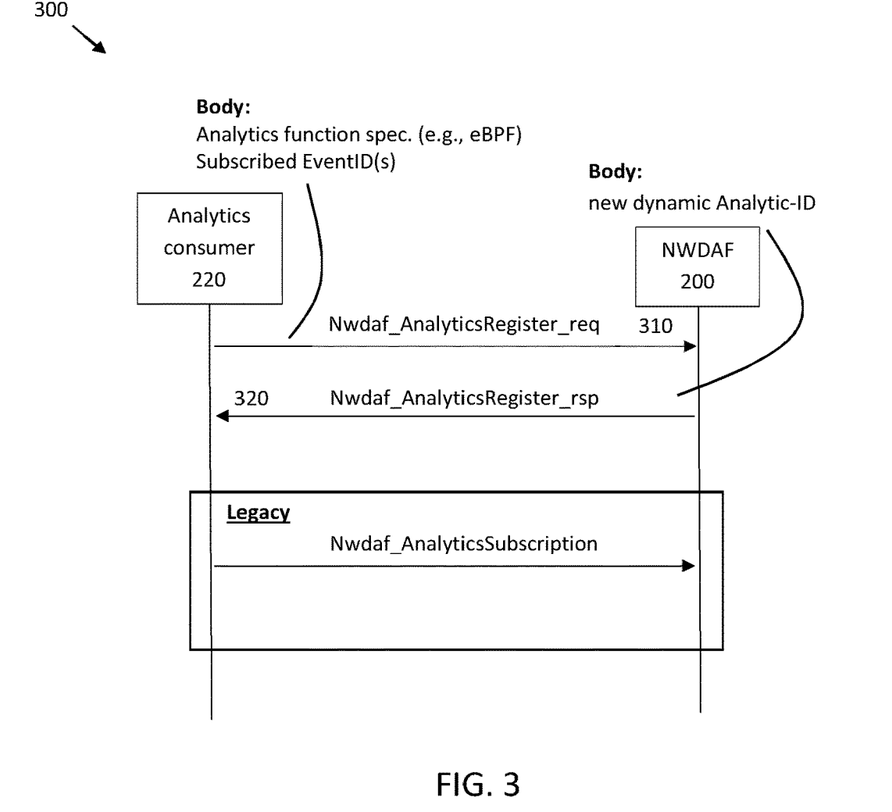
FIG. 3 shows a general analytics function definition procedure.

It is proposed herein to extend the NWDAF Service consumer Analytics Info service based interface (SBI) or application programming interface (API) by adding new procedures to install and execute arbitrary programs as part of the NWDAF services. The purpose of these programs is to generate analytic reports, that would then be subscribed to by some NWDAF consumer. FIG. 3 illustrates an example 300 of the proposed method. An analytics consumer function 220 generates and transmits a dynamic analytics function definition 310 (Nwdaf_AnalyticsRegister_req) to the NWDAF 200, which defines a custom analytics function for processing data at the NWDAF 200. This dynamic analytics function definition is freely designed by the analytics consumer function 220, which means that an operator may now define more or less any desired analytics function as the need arises, without having to resort to standardization changes or proprietary implementation in the NWDAF. In the example 300, the dynamic analytics function definition comprises a specification, which could be an extended Berkely Packet Filter (eBPF) program, a piece of swift code, or some other form of unambiguous function definition, e.g., a piece of C/C++ programming code. The definition preferably also comprises a set of subscribed event IDs. In this particular case it would mean that the consumer has full flexibility in pre-processing Event-ID data and the model itself. The downside could be that eBPF programs are likely not optimal with respect to some machine learning models (as compared to a specification based on, e.g., a differentiable computation graph). Also, if naively implemented inside the already running NWDAF container(s), it may not scale properly.

The NWDAF 200, after performing some optional verification and validation to make sure that the code is safe and correct, registers the new function, and responds back to the consumer function 220 with a new analytics identifier 320 (Nwdaf_AnalyticsRegister_rsp). The consumer function can then proceed according to legacy procedure and subscribe to the new analytics ID function at the NWDAF (Nwdaf_AnalyticsSubscription). The NWDAF will use the aforementioned Event IDs to collect data from data sources.

The problem of having dynamic analytics functions in this way could be decomposed into two separate tasks: signaling procedures for how to register/install/execute dynamic analytic functions and methods to specify and execute the dynamic analytic function after it has been installed. One issue with the current standard is to locate which analytics logical function (AnLF) or NWDAF instance that supports the dynamic analytics features discussed herein. A possible approach is to designate an Analytics-ID statically for all dynamic analytics, for example Analytics-ID=0. Any NWDAF that supports dynamic analytics then publishes Analytics-ID=0 towards the network repository function (NRF). An analytics consumer would then register the new dynamic analytics function towards any NWDAF that supports Analytics-ID=0. The new dynamic analytics function would then be assigned to a new temporary Analytics-ID, which it could then subscribe to. The new Analytics-ID would be considered local to the NWDAF that received the register call.

It is also possible to interact with NWDAFs directly, in which cases if the NWDAF cannot fulfill the requested analytics, is expected to redirect messages to an NWDAF that can fulfill those. 3GPP TS23.288 V17.0.0 provides examples such as if an NWDAF is in a different serving area and cannot fulfill the requested analytics, similarly one could extend this to also indicate support for different Analytics-IDs, i.e., if the local NWDAF cannot handle dynamic analytics (Analytics-ID=0) the local NWDAF shall redirect the subscribe/request to a target NWDAF that do support Analytics-ID=0 (and also fulfills the area of interest requirement). If we assume that Analytics-ID=0 is added as a static indicator of dynamic analytics, the aggregation NWDAF procedure is identical to legacy behavior.

3GPP TS23.288 V17.0.0 defines two groups of generic procedures that is part of the NWDAF specification. Nwdaf_AnalyticsSubscription, and Nwdaf_AnalyticsInfo. Nwdaf_AnalyticsSubscription pertains to subscribing to AnalyticsInfo events, the Nwdaf_AnalyticsInfo group is related to how to query individual events in a request/response. Neither really fits for registering new Analytic-IDs, so this disclosure proposes to add a third generic group called Nwdaf_AnalyticsRegister which would be related to any procedures relating to registering new analytic functions and associating them with data sources (Event-IDs).

Two example use-cases of the herein proposed techniques will now be provided. According to a first example use-case, when a VoLTE conference call is set up between e.g. seven participants, it may be desired to allocate a media resource function (MRF) that is geographically closest to the most central cell of all participants (the cell in the "middle"). As no analytics ID is standardized for this function, the signaling procedure initiated by the analytics consumer e.g. a MultiMedia Telephony (MMTel) AS instance, to the NWDAF for how to register this analytics function, includes an arbitrary program. An associated analytics ID e.g. "15" is returned.

After program registration, the analytics consumer, can subscribe to this off-standard analytics function by signaling a request to NWDAF for analytics ID "15", where the request contains the identities of the 7 participants. The NWDAF arbitrary program will then use UDM to find the access and mobility function (AMF) instance of each of the 7 conference participants. It then issues e.g. a SBI Namf_EventExposure Subscribe message to each AMF instance to collect the cell ID location of an individual end-user. The analysis function within the arbitrary program will derive the most central cell ID of all 7 obtain cell-IDs. This central cell ID is returned to the MMTel-AS analytics consumer. The consumer will then select an MRF instance that is configured for serving the area to which the central cell belongs.

As an alternative to novel use-cases, one could quite easily find alternative use-cases already covered by the standards, but where the current specification fails to be flexible enough to cater for all possible variations of possible uses. One such example could be a hypothetical use-case called pre-emptive caching, where if the network knows if a UE is about to enter a low-coverage or congested area, it may help the UE to pre-emptively download data for caching prior to entering that area.

The user data congestion predictions in 3GPP TS23.288 V17.0.0 were most likely intended to deal with similar such use cases. However, currently the only way to implement it would be for the network function (NF) to subscribe to Analytic-IDs for both "User Data Congestion" (UDC) and "UE mobility predictions" (UEMP). For a given user equipment (UE), the NF then needs to correlate the output of UDC with the trajectory obtained in the UEMP. However, that may not be the most efficient way to solve this problem as it assumes that the predicted trajectory from UEMP is very accurate.

An alternative approach to this problem could then be, given a certain UE, to predict what the probability of the UE entering this particular area-of-interest (during the congested period) is. This alternative interpretation could be much easier to solve accurately than trying to predict whole trajectories.

From an implementation perspective, many variants are possible. One could modify existing specification to allow UEMP to output a list of conditional and probable trajectories, or you could create a whole new analytics-ID. In the present context, this would not be necessary as the NF could register a new dynamic analytics id, which takes the same Event-IDs as input, and then predicts the probability of a UE entering congested area(s).

The procedure for such an approach would be:
1. AMF sends Nwdaf_AnalyticsRegister_req containing the program specification and a list of relevant Event-IDs. The 'program' calculates the probability of a particular UE entering a congested area.
2. NWDAF responds with a newly assigned dynamic Analytics-ID=15
3. AMF sends Nwdaf_AnalyticsSubscription_req (with Analytics-ID=15), and then continues with legacy behavior w.r.t. to analytic function subscriptions and so on.

Figure 4:
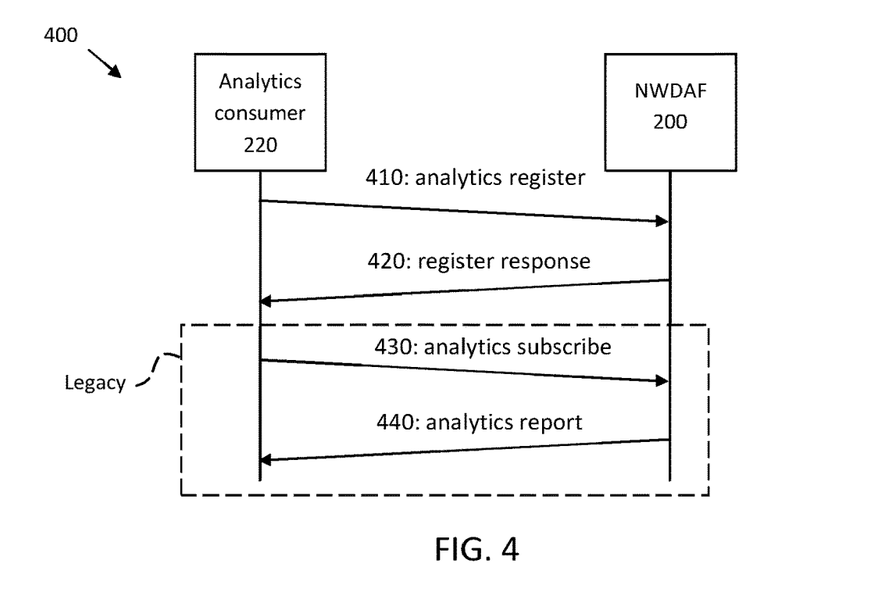
FIG. 4 is a signaling chart illustrating a general analytics function definition procedure.
Figure 6A:
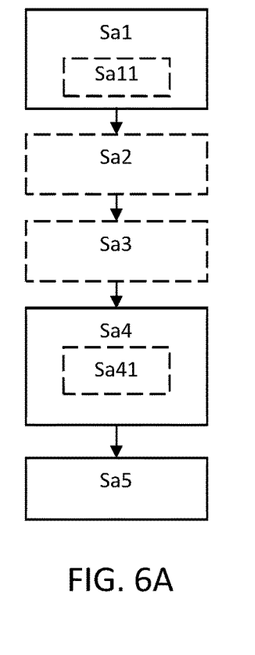
FIGS. 6A-B are flow charts illustrating methods.
Figure 6B:
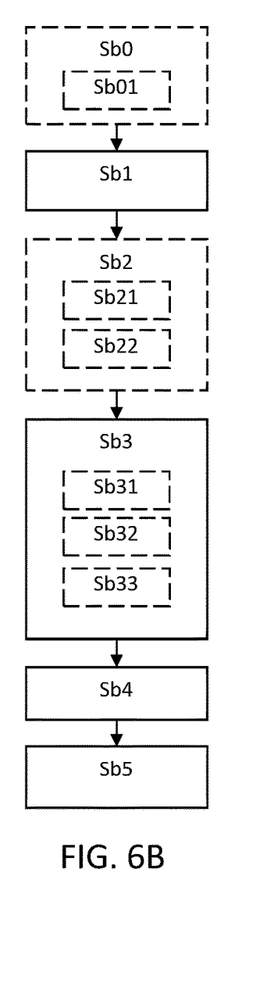

More generally, with reference to FIG. 4, and the flow charts in FIG. 6A and FIG. 6B, the present disclosure relates to a system for network data analytics. The system comprises an NWDAF 200 and at least one service consumer function (SCF) 220 arranged to connect to the NWDAF 200. The SCF 220 is arranged to obtain Sa1 a dynamic analytics function definition, wherein the dynamic analytics function definition defines a custom analytics function for processing data at the NWDAF 200, and register Sa4, 310, 410 the dynamic analytics function definition at the NWDAF 200. The function definition obtained by the SCF can either be generated at the SCF directly, downloaded from some repository comprising different analytic function definitions, or it can be received from some other network node as part of another process in the network. Thus, it is appreciated that the function definition can be obtained by the SCF in many different ways.

The NWDAF 200 is arranged to receive Sb1 the dynamic analytics function definition from the SCF 220 and assign Sb3 an analytics function identifier to the received dynamic analytics function definition, optionally after verifying the integrity of the dynamic analytics function definition it has received.

The NWDAF 200 is also arranged to transmit Sb4, 320, 420 the analytics function identifier back to the SCF 220, and register Sb5 the dynamic analytics function definition in an analytics function definition store of the NWDAF 200. The SCF 220 is arranged to receive Say, 320 the analytics identifier associated with the registered dynamic analytics function definition from the NWDAF 200 in response to the registering.

As mentioned above, either or both of the NWDAF 200 and the SCF 220 is preferably arranged to also verify Sa11, Sb2 the dynamic analytics function definition in accordance with one or more pre-determined verification criteria and abort the registration process if the verification criteria are not fulfilled. The verification may pertain to detecting harmful code not desired to be executed at the NWDAF, or inefficient code which could potentially consume significant amounts of processing resources, or code not abiding by one or more other requirements.

Figure 7:
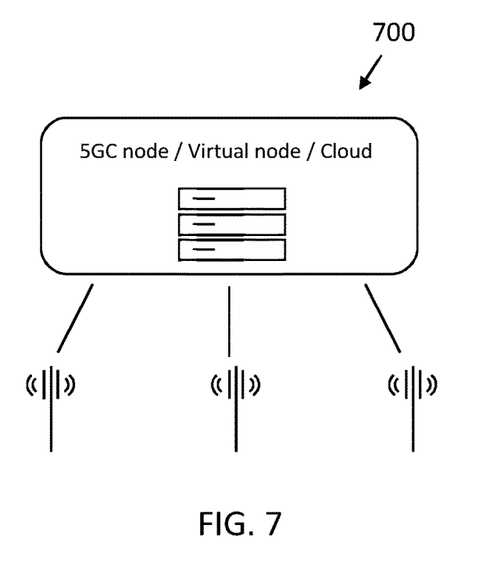
FIG. 7 schematically illustrates a core network function.
Figure 8:
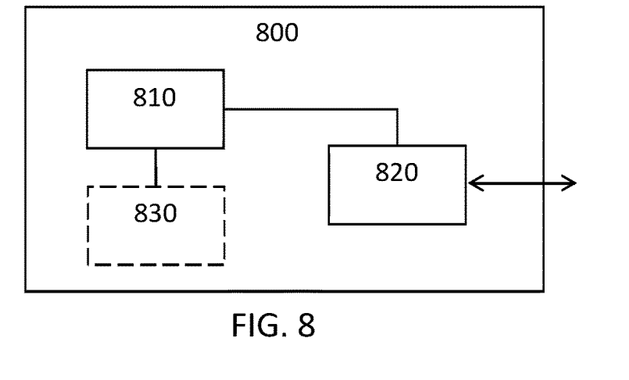
FIG. 8 schematically illustrates processing circuitry.

With reference primarily to FIGS. 6A and 6B, the methods disclosed herein are executed in part at the SCF and in part at the NWDAF, as will now be detailed. FIG. 7 and FIG. 8 schematically illustrate hardware realizations and will be discussed in more detail below.

FIG. 6A illustrates a computer implemented method, performed in a network node 700, 800 implementing an SCF 220, wherein the SCF is arranged to communicate with an NWDAF 200, the method comprises obtaining Sa1 a dynamic analytics function definition, wherein the dynamic analytics function definition defines a custom analytics function for processing data at the NWDAF 200. The function definition is defined according to specification by, e.g., an operator desiring to obtain some data which is not available given the standard analytics functions, or proprietary implementation. The dynamic analytics function definition is optionally associated Sa11 with an MTLF as discussed above. Thus, the methods discussed herein can be used together with the proposal in 3GPP TR 23.700-91 V17.0.0 2020-12-17.

The method optionally also comprises verifying Sa2 the dynamic analytics function definition in accordance with one or more pre-determined verification criteria and aborting the registration process if the verification criteria are not fulfilled. This step can serve as a safe-guard, such that no harmful or otherwise undesired code is introduced into the NWDAF architecture.

The method may also comprise building Sa3 the obtained dynamic analytics function definition into a predetermined format. This improved compatibility between different entities in the system, potentially provided by different hardware suppliers.

The method also comprises registering Sa4, 310, 410 the dynamic analytics function definition at the NWDAF 200. This registering optionally comprises transmitting Sa41 the dynamic analytics function definition to the NWDAF 200 as a program code, e.g., as an eBPF program, a swift code portion or the like. The method furthermore comprises receiving Say, 320, 420 the analytics identifier associated with the registered dynamic analytics function definition from the NWDAF 200 in response to the registering.

FIG. 6B illustrates the parts of the proposed techniques executed at the NWDAF end. In particular, there is illustrated a computer implemented method, performed in a network node 700, 800 implementing an NWDAF 200, wherein the NWDAF is arranged to communicate with at least one NWDAF SCF 220.

According to an option, the method comprises publishing Sb0 a pre-determined static analytics function identifier towards a network repository function (NRF) associated with the NWDAF 200. This can be a pre-determined static analytics function identifier may just be a pre-determined ID number, such as AnalyticsID=0, but can be any pre-determined identifier. The method may also comprise transmitting Sb01 a list of supported dynamic analytic functions in response to a request from the SCF 220 associated with the pre-determined static analytics function identifier. Thus, an SCF sending a request associated with the pre-determined static analytics function identifier can receive information about which dynamic analytics functions that are in place at the NWDAF and can be used without prior registration.

As discussed above, the method comprises receiving Sb1 a dynamic analytics function definition from the SCF 220.

This part of the overall method optionally comprises verifying Sb2 the dynamic analytics function definition in accordance with one or more pre-determined verification criteria and aborting the registration process if the verification criteria are not fulfilled, as discussed above. The method may furthermore comprise transmitting Sb21 an error message back to the SCF 220 in case one or more of the verification criteria were not fulfilled, which allows the SCF to adjust its operation accordingly. The verification criteria optionally comprise a security criteria Sb22 indicative of a data access associated with the dynamic analytics function definition.

The method further comprises assigning Sb3 an analytics function identifier to the received dynamic analytics function definition.

The method optionally comprises associating Sb31 an NWDAF sidecar container with the assigned analytics function identifier, which makes it easier to deal with corrupt function definitions and ensure aspects such as data privacy and the like. The method may also comprise building Sb32 the obtained dynamic analytics function definition into a predetermined format.

As discussed above, the methods discussed herein are compatible with the MTLF functions discussed in 3GPP TR 23.700-91 V17.0.0 2020-12-17. Thus, the method may furthermore comprise associating Sb33 the assigned analytics function identifier with a model training logical function, MTLF.

Figure 5:
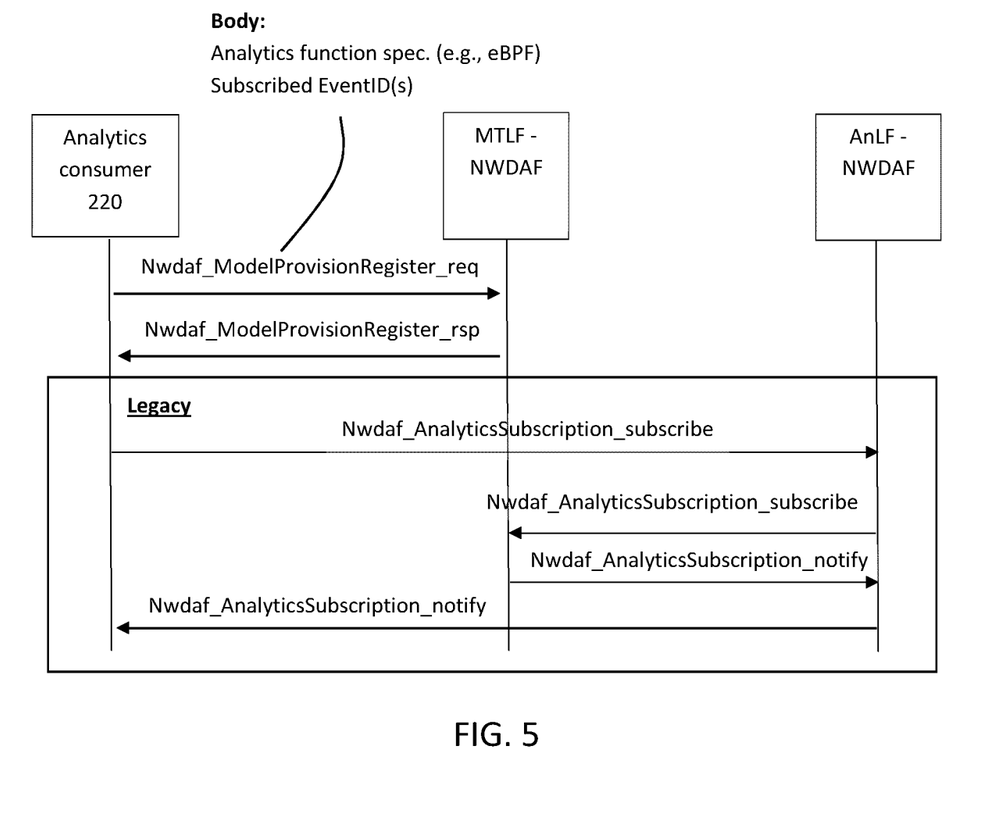
FIG. 5 shows another example analytics function definition procedure.

FIG. 5 illustrates an example of the herein proposed methods, where the MTLF is used for registering a new analytics ID using MTLF. MTLF was introduced in 3GPP TS23.288 V17.0.0 as a way for NWDAF service consumers to subscribe to events related to model training in machine learning analytics processes and the like. It is in its essence a way for the training function to notify consumers when the model training is complete and where to locate the "model file". The type of dynamic analytics discussed herein has a relation to model training. For instance, if a dynamic analytic function requires some training phase, it will also make sense to have the procedures in place to handle that. It is proposed to extend the Nwdaf_ModelProvision API by adding a corresponding Nwdaf_ModelProvision_register message as shown in FIG. 5. This message can contain the program specification, that will be used to train the model, and must also contain a set of Event-IDs that is used as input to the model during training. Output is up to the specification of course, and interpretation of the output at inference is also up to the consumer that sends the register request. Put differently, the output is opaque to the MTLF per se, and is up to the consumer to define. The Nwdaf_ModelProvision_register_response message contains the new temporary Analytic-ID that was assigned to the new analytic function. The consumer then subscribes to the new Analytic-ID as per the legacy procedure.

How to define the specification of the dynamic analytic functions is a somewhat complicated venture as there are many ways for a service consumer to express a set of specifications. As mentioned above, an MTLF Nwdaf_ModelProvision will return the path to a "model file". Since it does not mention the execution environment it would be assumed that it is up to the MTLF implementer to define what a "model file" and its corresponding execution environment actually means. Since the specification is coming from a third party the specification will actually have to be standardized as well. One common such example would perhaps be a model file in ONNX format, which is somewhat assuming that models are expressed as tensors for a neural network, so it does have its restrictions in terms of expressiveness. Another alternative could for instance be a serialized python class (as is typical in scikit-learn and joblib.dump).

In any case, such a model specification also needs to have an execution environment, meaning the NWDAF will need to start a new container, then load the execution environment for the ONNX file, and then start serving queries against that ONNX model. In the Dynamic Analytics case, there must be some known specification in terms of turning Event-IDs into a tensor suitable for the model. It is not obvious how to solve this problem in a flexible way.

Another alternative is that, instead of providing a "model file", the consumer registers a dynamic analytics function that is a full application, which is then started as a sidecar container as part of the NWDAF. This would allow full flexibility in pre-processing Event-ID data into whatever form is suitable for the model, and also allow close to linear scaling w.r.t. capacity. The complicated part is how to define a full service, build it, and then start the sidecar container from inside the NWDAF (which is not normally part of the orchestration layer).

The method also comprises transmitting Sb4, 320, 420 the analytics function identifier back to the SCF 220, and registering Sb5 the dynamic analytics function definition in an analytics function definition store of the NWDAF 200.

FIG. 7 illustrates various realizations 700 of the methods discussed above. The methods and receivers discussed above may be implemented in a 5GC node which could be deployed in a centralized manner or in a virtual node in the communications network 100. The split between the physical node and the centralized node can be on different levels. Parts of the proposed methods may of course also be implemented on a remote server comprised in a cloud-based computing platform.

FIG. 8 schematically illustrates, in terms of a number of functional units, the general components of a network node 800 according to embodiments of the discussions herein. Processing circuitry 810 is provided using any combination of one or more of a suitable central processing unit CPU, multiprocessor, microcontroller, digital signal processor DSP, etc., capable of executing software instructions stored in a computer program product, e.g., the form of a storage medium 830. The processing circuitry 810 may further be provided as at least one application specific integrated circuit ASIC, or field programmable gate array FPGA.

Particularly, the processing circuitry 810 is configured to cause the device 800 to perform a set of operations, or steps, such as the methods discussed in connection to FIGS. 6A and 6B and the discussions above. For example, the storage medium 830 may store the set of operations, and the processing circuitry 810 may be configured to retrieve the set of operations from the storage medium 830 to cause the device to perform the set of operations. The set of operations may be provided as a set of executable instructions. Thus, the processing circuitry 810 is thereby arranged to execute methods as herein disclosed. In other words, there is shown a network node 1800, comprising processing circuitry 810, a network interface 820 coupled to the processing circuitry 810 and a memory 830 coupled to the processing circuitry 810, wherein the memory comprises machine readable computer program instructions that, when executed by the processing circuitry, causes the network node to execute one or more of the operations, functions and methods discussed herein.

The storage medium 830 may also comprise persistent storage, which, for example, can be any single one or combination of magnetic memory, optical memory, solid state memory or even remotely mounted memory.

The device 800 may further comprise an interface 820 for communications with at least one external device. As such the interface 820 may comprise one or more transmitters and receivers, comprising analogue and digital components and a suitable number of ports for wireline or wireless communication.

The processing circuitry 810 controls the general operation of the device 800, e.g., by sending data and control signals to the interface 820 and the storage medium 830, by receiving data and reports from the interface 820, and by retrieving data and instructions from the storage medium 830. Other components, as well as the related functionality, of the control node are omitted in order not to obscure the concepts presented herein.

To summarize, FIGS. 7 and 8 schematically illustrate examples of a network node 700, 800 for implementing a NWDAF SCF 220, wherein the SCF is arranged to communicate with an NWDAF 200. The node comprises processing circuitry 810, a network interface 820 coupled to the processing circuitry 810, and a memory 830 coupled to the processing circuitry 810, wherein the memory comprises machine readable computer program instructions that, when executed by the processing circuitry, causes the network node to:

obtain a dynamic analytics function definition, wherein the dynamic analytics function definition defines a custom analytics function for processing data at the NWDAF 200, register 310, 410 the dynamic analytics function definition at the NWDAF 200, and receive 320, 420 the analytics identifier associated with the registered dynamic analytics function definition from the NWDAF 200 in response to the registering.

FIGS. 7 and 8 also schematically illustrate examples of a network node 700, 800 for implementing an NWDAF 200, wherein the NWDAF is arranged to communicate with at least one NWDAF SCF 220. The node comprises processing circuitry 810, a network interface 820 coupled to the processing circuitry 810, and a memory 830 coupled to the processing circuitry 810, wherein the memory comprises machine readable computer program instructions that, when executed by the processing circuitry, causes the network node to:

receive a dynamic analytics function definition from the SCF 220, assign an analytics function identifier to the received dynamic analytics function definition, transmit 320, 420 the analytics function identifier back to the SCF 220, and register the dynamic analytics function definition in an analytics function definition store of the NWDAF 200.

Figure 9:
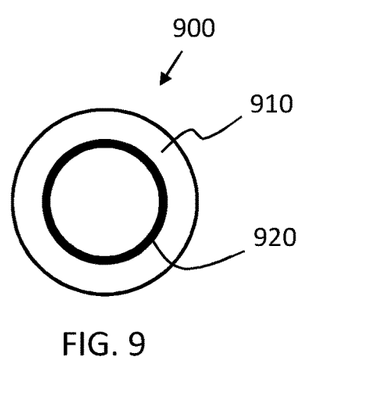
FIG. 9 shows a computer program product.

FIG. 9 illustrates a computer readable medium 910 carrying a computer program comprising program code means 920 for performing the methods illustrated in, e.g., FIG. 6A and FIG. 6B, when said program product is run on a computer. The computer readable medium and the code means may together form a computer program product 900.

The invention claimed is:

1. A system for network data analytics, the system comprising a network data analytics function (NWDAF) and a first service consumer function (SCF) arranged to connect to the NWDAF, wherein the SCF is arranged to:
  generate an analytics function definition, wherein the analytics function definition defines a custom analytics function for processing data at the NWDAF, and
  register the analytics function definition at the NWDAF,
the NWDAF is arranged to:
  receive the analytics function definition from the SCF,
  assign an analytics function identifier to the received analytics function definition,
  transmit the analytics function identifier back to the SCF, and
  register the analytics function definition in an analytics function definition store of the NWDAF, and
the SCF is further arranged to receive the analytics identifier associated with the registered analytics function definition from the NWDAF; and
the NWDAF and/or the SCF is arranged to verify the analytics function definition in accordance with verification criteria.

2. The system for network data analytics of claim 1, wherein
  the verification criteria comprises one or more verification criterions, and
  the NWDAF and/or the SCF is arranged to abort the registration process if any of the verification criterions are not fulfilled.

3. A computer implemented method, performed in a network node implementing service consumer function (SCF), wherein the SCF is arranged to communicate with a network data analytics function (NWDAF), the method comprising:
  generating an analytics function definition defining a custom analytics function for processing data at the NWDAF;
  verifying the analytics function definition in accordance with verification criteria;
  registering the analytics function definition at the NWDAF; and
  receiving the analytics identifier associated with the registered analytics function definition from the NWDAF.

4. The method of claim 3, further comprising associating the analytics function definition with a model training logical function, MTLF.

5. The method of claim 3, wherein the verification criteria comprises one or more verification criterions, and the method further comprises aborting the registration process if any of the verification criterions are not fulfilled.

6. The method of claim 3, further comprising building the generated analytics function definition into a predetermined format.

7. The method of claim 3, wherein the registering comprises transmitting the analytics function definition to the NWDAF as a program code.

8. The method of claim 3, wherein
  the network node implementing the SCF is comprised in a third generation partnership program (3GPP) defined wireless communication system, and
  the NWDAF is a network analytics function conforming to the specification set out in 3GPP Technical Specification (TS) 23.288 V17.0.0.

9. A non-transitory computer readable storage medium storing a computer program comprising program code means for performing the method of claim 3 when said program is run on a computer or on processing circuitry of a network node.

10. A computer implemented method, performed in a network node implementing a network data analytics function (NWDAF), wherein the NWDAF is arranged to communicate with at least a first service consumer function (SCF), the method comprising:
  receiving an analytics function definition from the first SCF;
  verifying the analytics function definition in accordance with verification criteria;
  assigning an analytics function identifier to the received analytics function definition;
  transmitting the analytics function identifier to the first SCF; and
  registering the analytics function definition in an analytics function definition store of the NWDAF.

11. The method of claim 10, wherein the NWDAF is a network analytics function conforming to the specification set out in 3GPP TS 23.288 V17.0.0.

12. The method of claim 10, further comprising publishing a pre-determined static analytics function identifier towards a network repository function (NRF) associated with the NWDAF.

13. The method of claim 12, further comprising
  receiving a request from the first SCF associated with the pre-determined static analytics function identifier, and
  transmitting a list of supported analytics functions in response to the request.

14. The method of claim 10, wherein the verification criteria comprises one or more verification criterions, and the method further comprises aborting the registration process if any of the verification criterions are not fulfilled.

15. The method of claim 14, comprising transmitting an error message to the SCF in case one or more of the verification criterions were not fulfilled.

16. The method of claim 14, wherein the verification criteria comprise a security criteria, wherein the security criteria are indicative of a data access associated with the analytics function definition.

17. The method of claim 10, further comprising associating an NWDAF sidecar container with the assigned analytics function identifier.

18. The method of claim 10, further comprising building the generated analytics function definition into a predetermined format, where the building comprises training the analytics function on one or more datapoints.

19. The method of claim 10, further comprising associating the assigned analytics function identifier with a model training logical function.

20. The method of claim 10, wherein the NWDAF is associated with an NWDAF consumer analytics info service-based interface and/or an application programming interface as described in 3GPP TS 23.288 V17.0.0.

* * * * *